UNITED STATES PATENT OFFICE.

JOSEPH A. KLEIN, OF NEW YORK, N. Y.

MEDICINAL COMPOUND.

1,420,634.  Specification of Letters Patent.  Patented June 27, 1922.

No Drawing.   Application filed April 30, 1920.   Serial No. 377,843.

*To all whom it may concern:*

Be it known that I, JOSEPH A. KLEIN, residing at New York, in the county and State of New York, have invented certain new and useful Improvements in a Medicinal Compound, of which the following is a specification.

This invention relates to a new and improved medicinal compound and process of producing the same, and one of the objects of the invention is to provide an improved local anæsthetic which, although useful in many relations, is particularly useful in the practice of dentistry.

Another object of the invention is to produce an anæsthetic of the above nature which has no action upon unbroken skin, but when applied to mucuous membrance it produces local anæsthesia.

Another object of the invention is to provide an anæsthetic compound of the above nature, which is very effective in its operation, producing, when properly applied, complete local anæsthesia, and which leaves no painful and dangerous after-effects, such as are produced by anæsthetics of narcotics applied by injection, or general anæsthesias.

A further object of the invention is to provide a material that is a good antiseptic, disinfectant, anodyne, styptic and astringent.

Other objects and aims of the invention more or less specific than those referred to above, will be in part obvious and in part pointed out in the course of the following description of the steps and the relation of each step to one or more of the others thereof employed in carrying out my process, and the scope of protection contemplated will be indicated in the appended claims.

In carrying out my invention I proceed as follows: I first take 110 parts of ether sulfuricum, 2 parts of folia menthæ and 3 parts of folia urtica; mix said ingredients thoroughly and permit the mixture to stand in a sealed receptacle for a period of about eight days in a warm temperature, the temperature which I prefer being about 100° F. This produces a tincture which I term tincture of ætheris-folia-menthæ-urtica.

I next take 200 parts of menthol and 300 parts of trichlor-acetic acid, and thoroughly stir said ingredients for fifteen minutes at a temperature of 110° F.

When complete liquefaction of these ingredients is obtained, and which liquid mixture I term acid-trichlor-acetic-mentholis, I mix therewith 100 parts of the tincture of ætheris-folia-menthæ-urtica, as above described, and add 400 parts of creosote, a material known as beechwood creosote, being preferably employed in this relation.

These ingredients when thoroughly mixed, produce my improved anæsthetic compound.

The medicinal compound produced is a greenish liquid with a characteristic ethereal odor, with a somewhat burning, but afterwards cooling, taste. It is insoluble in water, but soluble in alcohol, chloroform and ether and has a faint acid reaction.

In action this medicinal compound combines with the alkaline secreting substances of the mucous secreting cells in the mucous tissue, and produces a decomposition, and there is formed a new substance somewhat similar to chloroform in its behaviour (in that it acts conductively to the sensory nerve endings) resulting in analgesic action during the period of operation.

The manner of applying the same to the mucous membrane, as to for instance in the case of a tooth extraction, first protect the immediate parts by suitable coverings, such as rolls of cotton; then dip a pellet of cotton in the medicinal substance and apply it with mild friction to the tissue surrounding the tooth from the gingival border to the apex or apices of root or roots. Before extraction is attempted, the patient should be required to wait from five to ten minutes to permit complete penetration of the substance.

My improved anæsthetic is also useful as a styptic, being applied directly to the source of hemorrhage. In cases of alveolar pain, it is also useful and it is likewise useful as an anodyne in cases of stomatitis, gingivitis or pyorrheal pain, the material being applied to the inflamed area by a gentle friction.

It will accordingly be seen that I have provided a new and improved anæsthetic compound, possessing, among others, all the advantages above pointed out, and among which fills the crying need in the dental profession.

As many changes could be made in this construction without departing from the scope of the following claims, it is intended that all matter contained in the above description shall be interpreted as illustrative only and not in a limiting sense.

Having thus described my invention what

I claim as new and desire to secure by Letters Patent is:

1. The herein described anæsthetic compound composed of tincture of ætheris-folia-menthæ-urtica, menthol-trichlor-acetic acid and beechwood creosote.

2. An improved anæsthetic compound composed a portion of ætheris-folia-menthæ-urtica, and larger portions of acid trichlor-acetic mentholis and beechwood creosote.

3. As a new article of manufacture, an anæsthetic compound composed of 100 parts of tincture of ætheris-folia-menthæ urtica, 500 parts of acid trichlor-acetic, mentholis, and 400 parts of beechwood creosote.

4. The improved process of producing an anæsthetic compound which consists in mixing 110 parts of ether-sulfuricum, with two parts of folia-menthæ and three parts of folia-urtica, permitting said mixture to stand in a sealed receptacle for a suitable period in a warm temperature, taking 200 parts of menthol, 300 parts of trichlor-acetic acid, mixing said ingredients to a temperature above 100° F., or until a complete liquefaction of said materials takes place, and then adding to said last named mixture 100 parts of the first described mixture and 400 parts of beechwood creosote.

In testimony whereof I affix my signature in the presence of two witnesses.

JOSEPH A. KLEIN, D. D. S.

Witnesses:
L. AUPERIN,
MILDRED HEMBDT.